United States Patent
Okada

(10) Patent No.: US 9,637,187 B2
(45) Date of Patent: May 2, 2017

(54) RUBBER CRAWLER

(71) Applicant: BRIDGESTONE CORPORATION, Chuo-ku, Tokyo (JP)

(72) Inventor: Kaoru Okada, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 51 days.

(21) Appl. No.: 14/409,476

(22) PCT Filed: Jun. 18, 2013

(86) PCT No.: PCT/JP2013/066761
§ 371 (c)(1),
(2) Date: Dec. 19, 2014

(87) PCT Pub. No.: WO2014/010378
PCT Pub. Date: Jan. 16, 2014

(65) Prior Publication Data
US 2015/0321712 A1   Nov. 12, 2015

(30) Foreign Application Priority Data
Jul. 10, 2012   (JP) ................................. 2012-154906

(51) Int. Cl.
*B62D 55/24*   (2006.01)
(52) U.S. Cl.
CPC .................................. *B62D 55/244* (2013.01)
(58) Field of Classification Search
CPC ..... B62D 55/244; B62D 55/24; B62D 55/253
See application file for complete search history.

(56) References Cited

U.S. PATENT DOCUMENTS 3,747,995 A * 7/1973 Russ, Sr. ............... B62D 55/244
                                              305/170
3,858,948 A * 1/1975 Johnson ............... B62D 55/244
                                              305/167

(Continued)

FOREIGN PATENT DOCUMENTS

JP   2000-33889 A   2/2000
JP   2002-211455 A  7/2002

(Continued)

OTHER PUBLICATIONS

Extended European Search Report dated Feb. 10, 2016, issued in corresponding EP Patent Application.

*Primary Examiner* — Hau Phan
(74) *Attorney, Agent, or Firm* — SOLARIS Intellectual Property Group, PLLC

(57) ABSTRACT

A rubber crawler includes a rubber belt trained around a drive wheel, plural rubber projections that are provided at the rubber belt at intervals along the crawler circumferential direction, that project toward the crawler circumferential inside, that are each formed in a peaked shape widening from an apex portion to a base portion as viewed from the crawler width direction, and that are input with drive force when an engagement pin provided at the drive wheel engages with a circumferential direction rubber wall face, and an embedded member that is embedded in the rubber projections and has a circumferential direction wall face arranged along the circumferential direction rubber wall face as viewed in cross-section along the crawler circumferential direction.

3 Claims, 8 Drawing Sheets

(56) References Cited

U.S. PATENT DOCUMENTS

| | | | | |
|---|---|---|---|---|
| 6,079,802 | A * | 6/2000 | Nishimura | B62D 55/244 305/157 |
| 6,196,646 | B1 * | 3/2001 | Edwards | B62D 55/244 305/167 |
| 6,536,852 | B2 * | 3/2003 | Katayama | B62D 55/244 305/170 |
| 6,793,296 | B2 * | 9/2004 | Deland | B62D 55/32 305/167 |
| 6,932,442 | B2 * | 8/2005 | Hori | B62D 55/244 305/167 |
| 7,407,236 | B2 * | 8/2008 | Fukushima | B62D 55/244 305/167 |
| 7,784,884 | B2 * | 8/2010 | Soucy | B62D 55/244 305/171 |
| 2008/0211300 | A1 | 9/2008 | Matsuo et al. | |

FOREIGN PATENT DOCUMENTS

| | | | |
|---|---|---|---|
| JP | 2004-330830 | A | 11/2004 |
| JP | 2004322866 | A * | 11/2004 |
| JP | 2006-88664 | A | 4/2006 |
| JP | 2006-321387 | A | 11/2006 |
| JP | 2007-22304 | A | 2/2007 |
| JP | 2007-276735 | A | 10/2007 |
| WO | 2011/045993 | A1 | 4/2011 |
| WO | 2012/039431 | A1 | 3/2012 |

* cited by examiner

RUBBER CRAWLER

TECHNICAL FIELD

The present invention relates to a rubber crawler.

BACKGROUND ART

As an example of a rubber crawler, a type of rubber crawler exists in which drive force is transmitted by making pins, provided to a drive wheel at a machine body side, contact rubber projections provided at a specific pitch at an inner peripheral face of the rubber crawler (see, for example Japanese Patent Application Laid-Open (JP-A) No. 2000-33889).

In a rubber crawler described in JP-A No. 2000-33889, a substantially circular column shaped wear resistant member extending in the crawler width direction is embedded inside a rubber projection. Both end portions of the wear resistant member are exposed at side walls of the rubber projection, and wear of the side walls of the rubber projection can be suppressed by the wear resistant member contacting underbody components at a machine body side, such as a drive wheel.

SUMMARY OF INVENTION

Technical Problem

However, there is a tendency for distortion to be concentrated around the circular column shaped wear resistant member when the pin of the drive wheel pushes the rubber projection with a strong force.

An object of the present invention is to suppress distortion from concentrating around an embedded member embedded in a rubber projection.

Solution to Problem

A rubber crawler of a first aspect of the present invention includes an endless rubber body trained around a drive wheel, a plurality of rubber projections that are provided at the rubber body at intervals along a circumferential direction of the rubber body, that project toward an inner circumferential side of the rubber body, that are each formed in a peaked shape widening from an apex portion to a base portion as viewed from a width direction of the rubber body, and that are input with drive force when an engagement pin provided at the drive wheel engages with a rubber wall face of the rubber projections in the rubber body circumferential direction, and an embedded member that is embedded in the rubber projections and has a wall face in the rubber body circumferential direction arranged along the rubber wall face as viewed in cross-section along the rubber body circumferential direction.

Advantageous Effects of Invention

As explained above, a rubber crawler of the present invention can suppress distortion from concentrating around an embedded member embedded in a rubber projection.

DESCRIPTION OF EMBODIMENTS

First Exemplary Embodiment

Explanation follows regarding a rubber crawler according to a first exemplary embodiment of the present invention.

An endless rubber crawler 10 serving as an example of a rubber crawler according to the first exemplary embodiment is what is referred to as a metal-core-less type rubber crawler that does not have a metal core.

Figure 1:
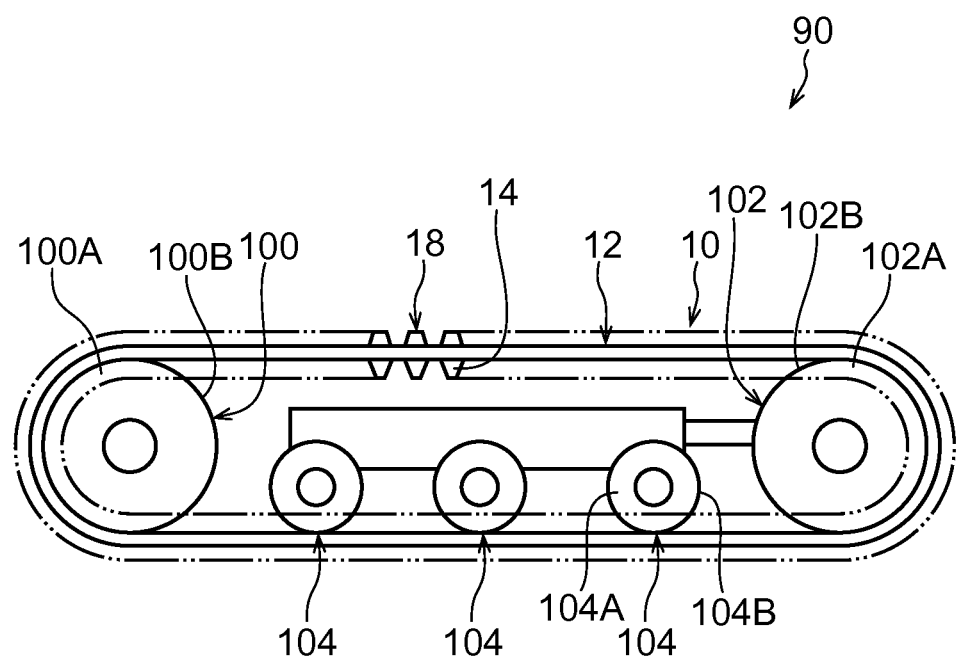
FIG. 1 is a side view of a rubber crawler of a first exemplary embodiment viewed from the crawler width direction.

As illustrated in FIG. 1, the rubber crawler 10 is employed trained around a drive wheel 100 coupled to a drive shaft of a tracked vehicle, serving as a machine body, and an idler wheel 102 rotatably attached to the tracked vehicle. Plural rollers 104 are disposed at the inner circumference of the rubber crawler 10 between the drive wheel 100 and the idler wheel 102, and the rollers 104 are rotatably attached to the tracked vehicle so as to rotate.

In the explanation below the drive wheel 100, the idler wheel 102, and the rollers 104 are collectively referred to as wheels that are underbody components on the machine body side, as appropriate.

In the present exemplary embodiment, the circumferential direction of the endless rubber crawler 10 (the arrow S direction in FIG. 3 and FIG. 4) is referred to as the crawler circumferential direction, and the width direction of the rubber crawler 10 (the arrow W direction in FIG. 3 and FIG. 4) is referred to as the crawler width direction. The crawler circumferential direction and the crawler width direction are orthogonal to one another as viewed from the circumferential outside or the circumferential inside of the rubber crawler 10.

In the present exemplary embodiment, the circumferential inside (the arrow IN direction side in FIG. 5 and FIG. 6) of the rubber crawler 10, trained in a loop shape around the drive wheel 100 and the idler wheel 102, is referred to as the crawler circumferential inside, and the circumferential outside of the rubber crawler 10 (the arrow OUT direction side in FIG. 5 and FIG. 6) is referred to as the crawler circumferential outside. The arrow IN direction (loop shape inside direction) and the arrow OUT direction (loop shape outside direction) in FIG. 5 and FIG. 6 indicate the inward and outward directions of the rubber crawler 10 in a trained state (in other words, the thickness direction of the rubber crawler 10).

In the present exemplary embodiment, the rubber crawler 10 is configured trained around the drive wheel 100 and the idler wheel 102; however the present invention is not limited thereto, and depending on the placement of the drive wheel 100, the idler wheel 102, and the plural rollers 104, the rubber crawler 10 may be configured trained around one or more of the plural rollers 104 in addition to the drive wheel 100 and the idler wheel 102.

As illustrated in FIG. 1, the drive wheel 100, the idler wheel 102, the rollers 104, and the rubber crawler 10 trained around the drive wheel 100 and the idler wheel 102 configure a crawler traveling device 90 of the first exemplary embodiment, serving as a traveling section of the tracked vehicle.

Figure 8:
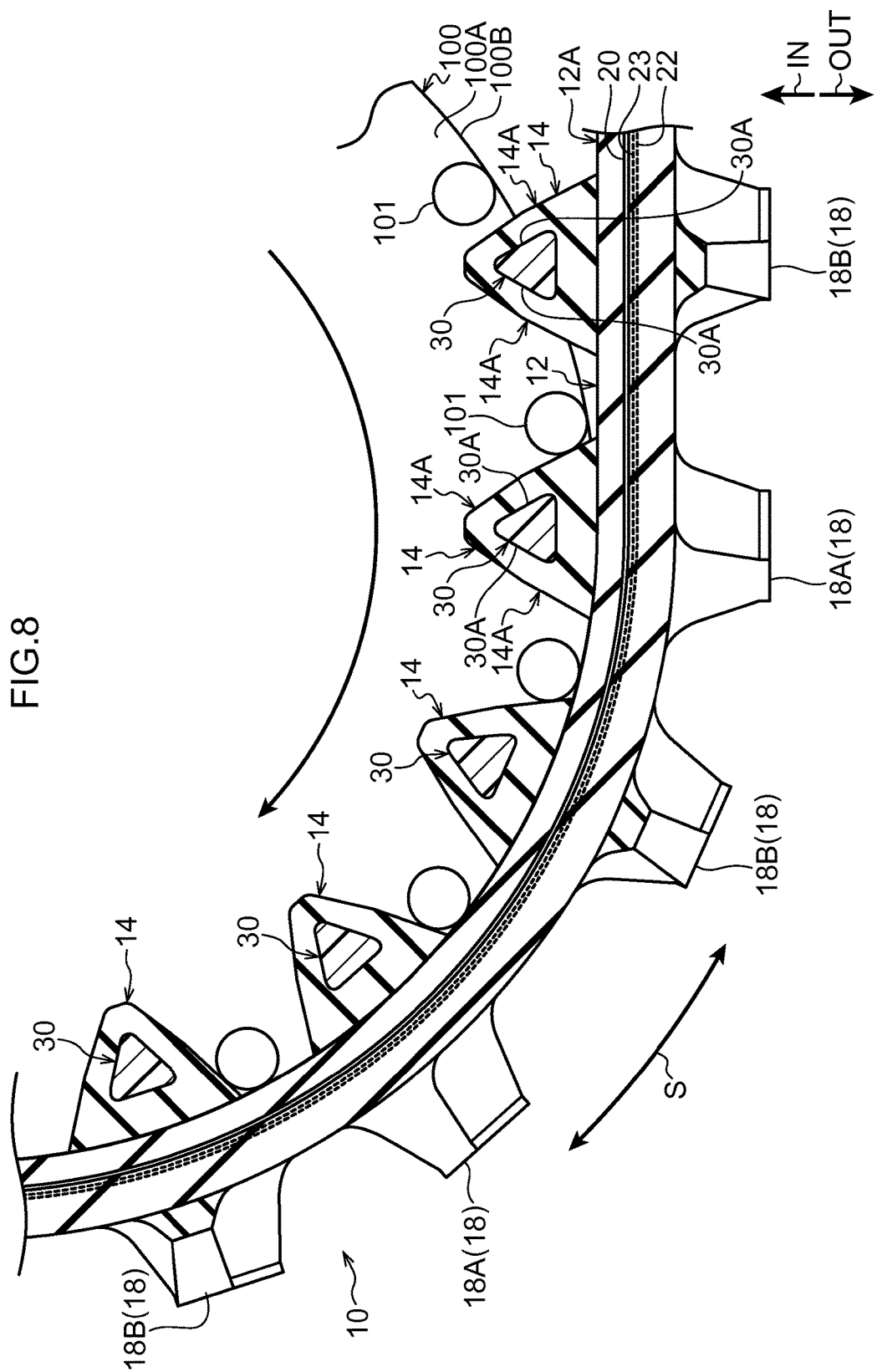
FIG. 8 is a side cross-section of a rubber crawler cut along the center line, in order to explain a state in which the rubber crawler of the first exemplary embodiment is trained around a drive wheel.

As illustrated in FIG. 1, the drive wheel 100 includes a pair of circular plate shaped wheel portions 100A coupled to the drive shaft of the tracked vehicle. Outer circumferential faces 100B of the wheel portions 100A contact and rotate wheel-rotated faces 16 of the rubber crawler 10, described later. Circular column shaped engagement pins 101 are formed at specific intervals in the circumferential direction so as to span across between respective circumferential edge portions of the pair of wheel portions 100A. As illustrated in FIG. 8, the engagement pins 101 each engage with a rubber projection 14, described later, and transmit (input) drive force from the tracked vehicle to the rubber crawler 10 by engaging with the rubber projection 14 (specifically, a circumferential direction rubber wall face 14A in the crawler circumferential direction of the rubber projection 14). In this manner, the rubber crawler 10 to which drive force is transmitted circulates between the drive wheel 100 and the idler wheel 102. Lugs 18, described later, grip the ground surface due to circulation of the rubber crawler 10, and the tracked vehicle including the crawler traveling device 90 moves (travels).

The idler wheel 102 includes a pair of circular plate shaped wheel portions 102A rotatably attached to the tracked vehicle. Outer circumferential faces 102B of the wheel portions 102A contact the wheel-rotated faces 16 of the rubber crawler 10, described later. A pressing mechanism, for example a hydraulic pressing mechanism, not illustrated in the drawings, is provided on the tracked vehicle side to push the idler wheel 102 in a direction away from the drive wheel 100, and press the idler wheel 102 against the wheel-rotated faces 16 of the rubber crawler 10 so as to maintain tension (tensile force) in the rubber crawler 10.

The rollers 104 support the weight of the tracked vehicle, and include circular plate shaped wheel portions 104A rotatably attached to the tracked vehicle. Outer circumferential faces 104B of the wheel portions 104A contact the wheel-rotated faces 16 of the rubber crawler 10, described later.

The idler wheel 102 and the rollers 104 rotate following the rubber crawler 10 circulating between the drive wheel 100 and the idler wheel 102.

As illustrated in FIG. 1, the rubber crawler 10 includes a rubber belt 12 formed from rubber in an endless belt shape. The rubber belt 12 of the present exemplary embodiment is an example of an endless rubber body of the present invention. The circumferential direction, width direction, circumferential inside, and circumferential outside of the rubber belt 12 of the present exemplary embodiment correspond to the crawler circumferential direction, the crawler width direction, the crawler circumferential inside, and the crawler circumferential outside, respectively.

Figure 2:
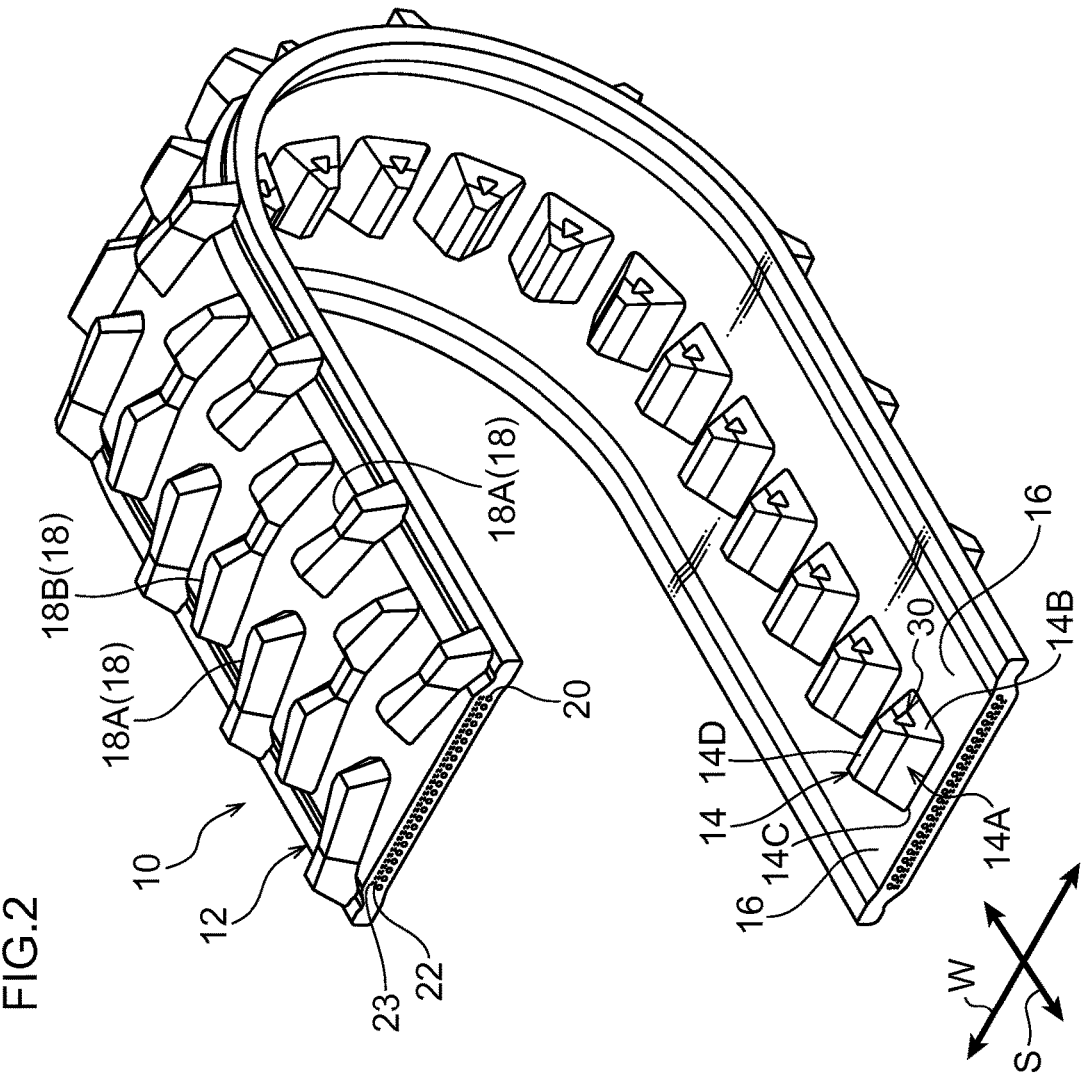
FIG. 2 is a perspective view including a partial cross-section of a rubber crawler of the first exemplary embodiment.
Figure 3:
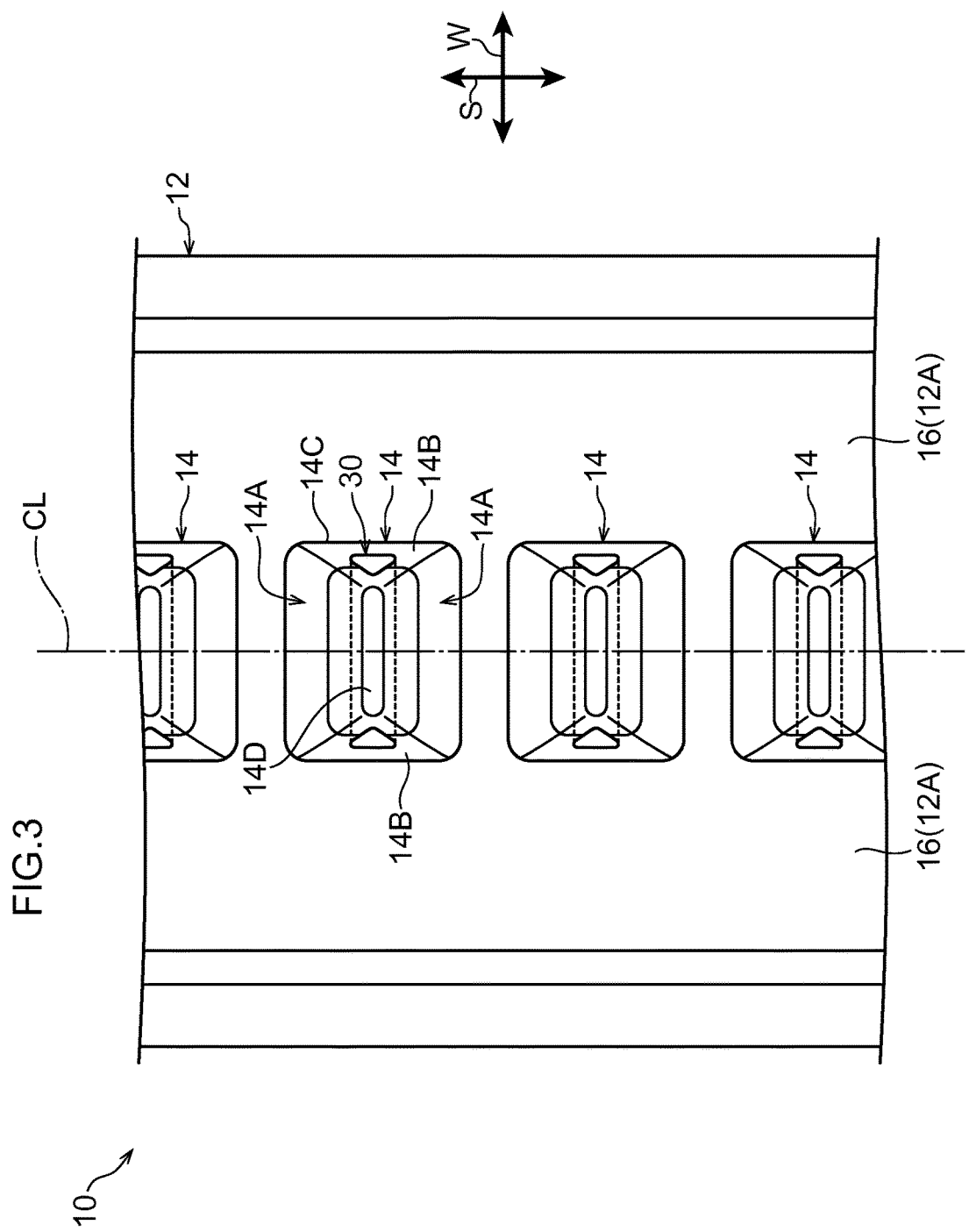
FIG. 3 is a plan view of a rubber crawler of the first exemplary embodiment viewed from the circumferential inside.

As illustrated in FIG. 1 to FIG. 3, the plural rubber projections 14 are formed at intervals in the crawler circumferential direction projecting toward the crawler circumferential inside at the inner periphery of the rubber belt 12. The rubber projections 14 are disposed at a crawler width direction center portion of the rubber belt 12, and are restricted by contact with the wheels (the drive wheel 100, the idler wheel 102 and the rollers 104) that rotate on the wheel-rotated faces 16, described later, moving toward the crawler width direction. In other words, relative displacement in the crawler width direction between the wheels and the rubber crawler 10 (the rubber belt 12) can be restricted by contact of the rubber projections 14 with the wheels.

Note that side face portions of the wheels contact width direction rubber wall faces 14b in the crawler width direction of the rubber projections 14 in the present exemplary embodiment.

As illustrated in FIG. 2 and FIG. 3, the wheel-rotated faces 16 are each formed extending along the crawler circumferential direction at both crawler width direction sides, with the rubber projections 14 of the rubber belt 12 interposed therebetween. The wheel-rotated faces 16 are flat shaped, and each configure a portion of an inner peripheral face 12A of the rubber belt 12.

Figure 4:
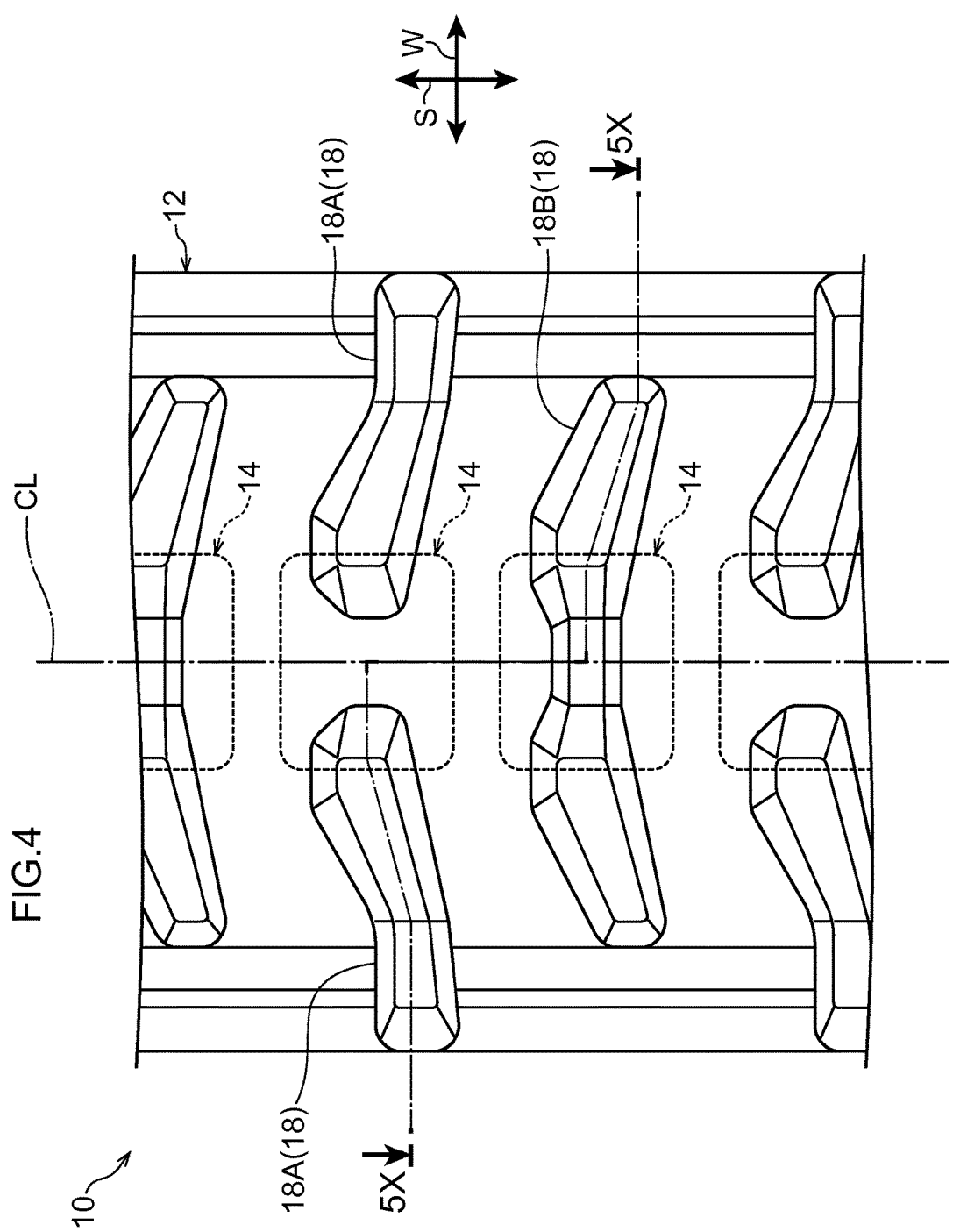
FIG. 4 is a plan view of a rubber crawler of the first exemplary embodiment, as viewed from the circumferential outside.
Figure 5:
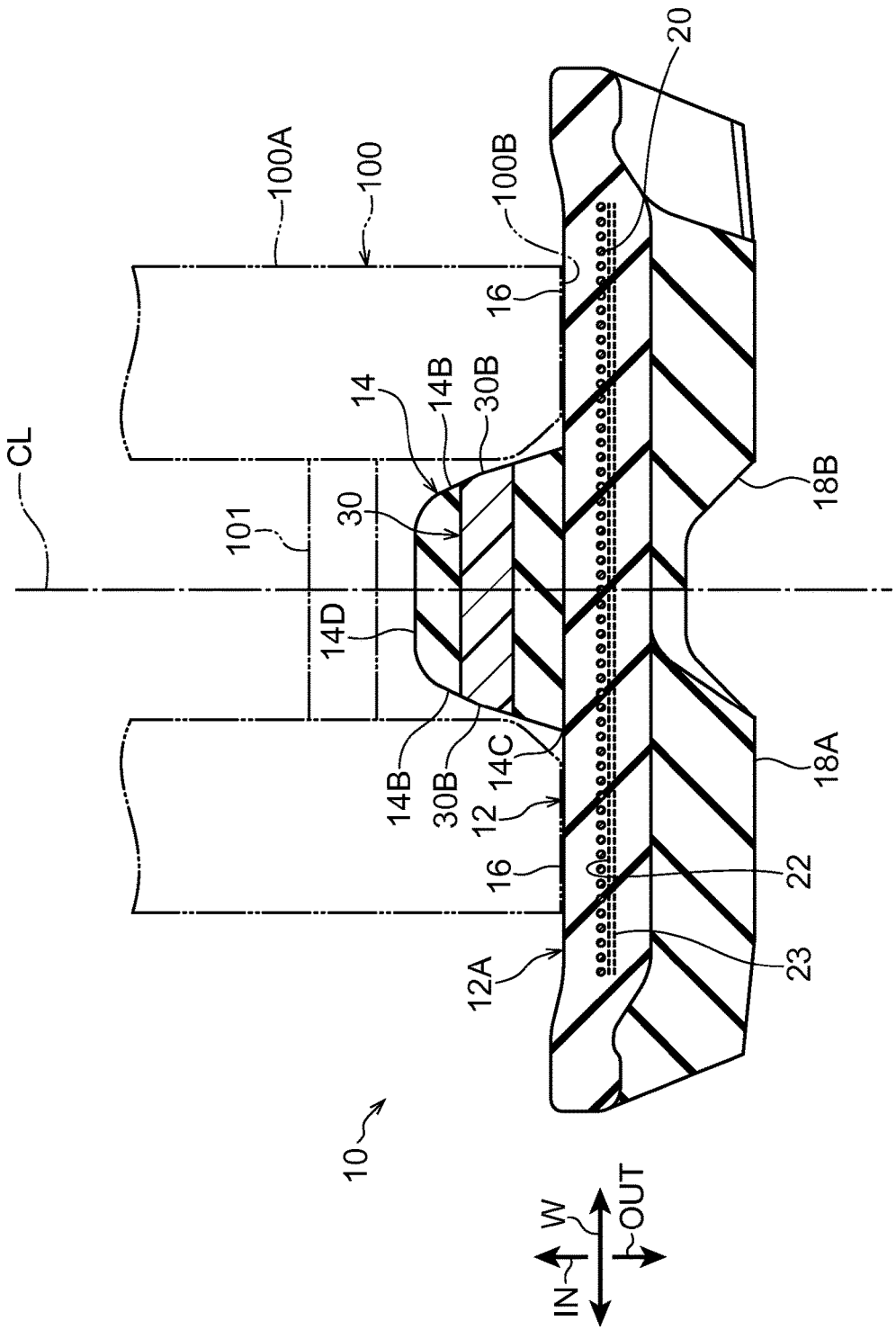
FIG. 5 is a cross-section taken along line 5X to 5X in FIG. 4.

As illustrated in FIG. 4 and FIG. 5, the block shaped lugs 18 that contact the ground face are formed protruding toward the crawler circumferential outside at the outer periphery of the rubber belt 12. As illustrated in FIG. 4, the lugs 18 are each configured by a pair of lugs 18A disposed at the left and right, with the center line CL interposed therebetween, and a pair of lugs 18B disposed so as to run across the center line CL, with the lugs 18A and the lugs 18B alternately formed along the crawler circumferential direction. The lugs 18A and the lugs 18B are each disposed such that portions thereof are superimposed at the crawler circumferential outside of the rubber projections 14.

Figure 6:
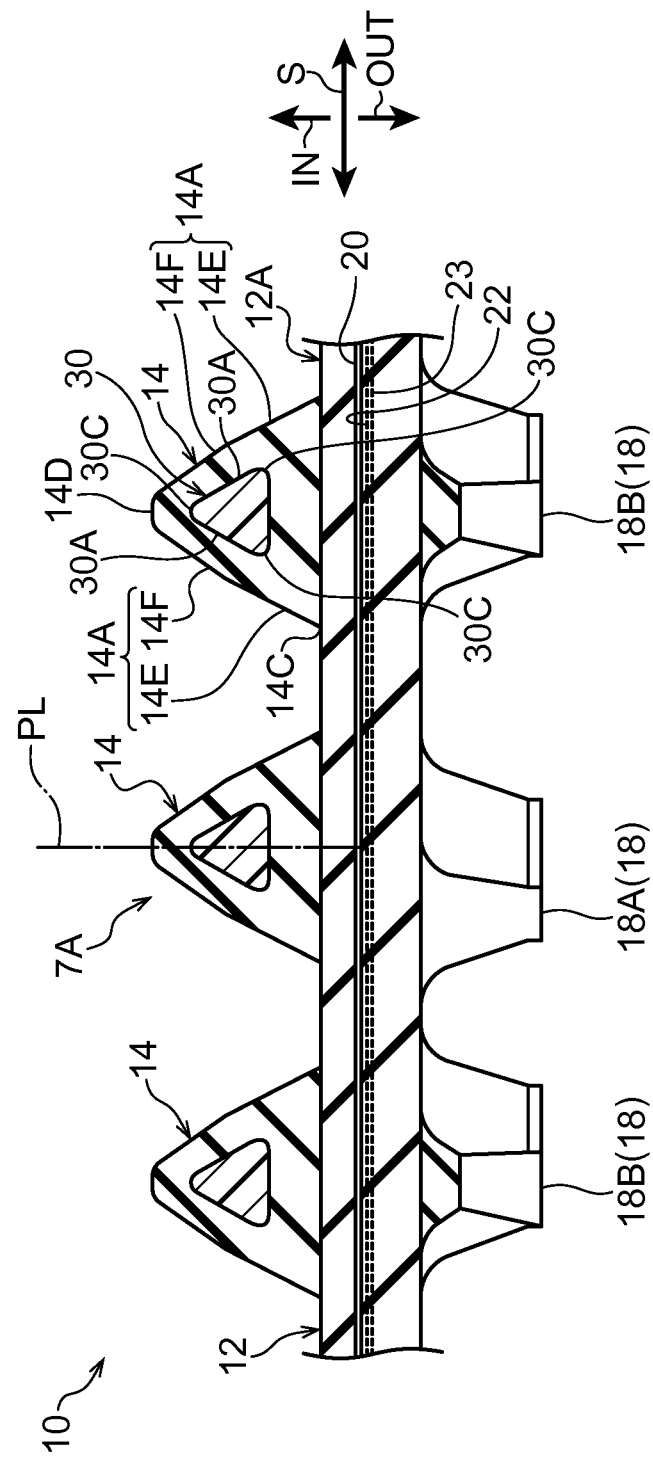
FIG. 6 is a side cross-section of a rubber crawler of the first exemplary embodiment cut along the center line.

As illustrated in FIG. 5 and FIG. 6, an endless belt shaped main cord layer 20 extending along the crawler circumferential direction is embedded in the rubber belt 12. The main cord layer 20 is formed by covering in rubber a single main cord wound in a spiral shape running along the crawler circumferential direction, or plural reinforcement cords running along the crawler circumferential direction and aligned in a row in the crawler width direction. In the present exemplary embodiment, a steel cord having excellent tensile strength is employed as the main cord; however configuration is not limited thereto, and a cord configured of organic fiber or the like may be employed as the main cord, for example, as long as tensile strength is sufficient.

Bias cord layers 22, 23 are each embedded in the rubber belt 12 at the crawler circumferential outside of the main cord layer 20. The bias cord layers 22, 23 are formed by aligning parallel to each other bias cords that extend diagonally with respect to the crawler circumferential direction, and embedding the bias cords in belt shaped rubber. The bias cords of the bias cord layer 22 and the bias cords of the bias cord layer 23 span across the center line CL, extending in opposite directions to each other. In the present exemplary embodiment, steel cords having excellent tensile strength are employed as each of the bias cords of the bias cord layers 22, 23; however configuration of the present invention is not limited thereto, and cords configured of organic fiber or the like may be employed as the bias cords, for example, as long as tensile strength is sufficient.

Detailed explanation following regarding the rubber projections 14, previously mentioned, and an embedded member 30.

Figure 7A:
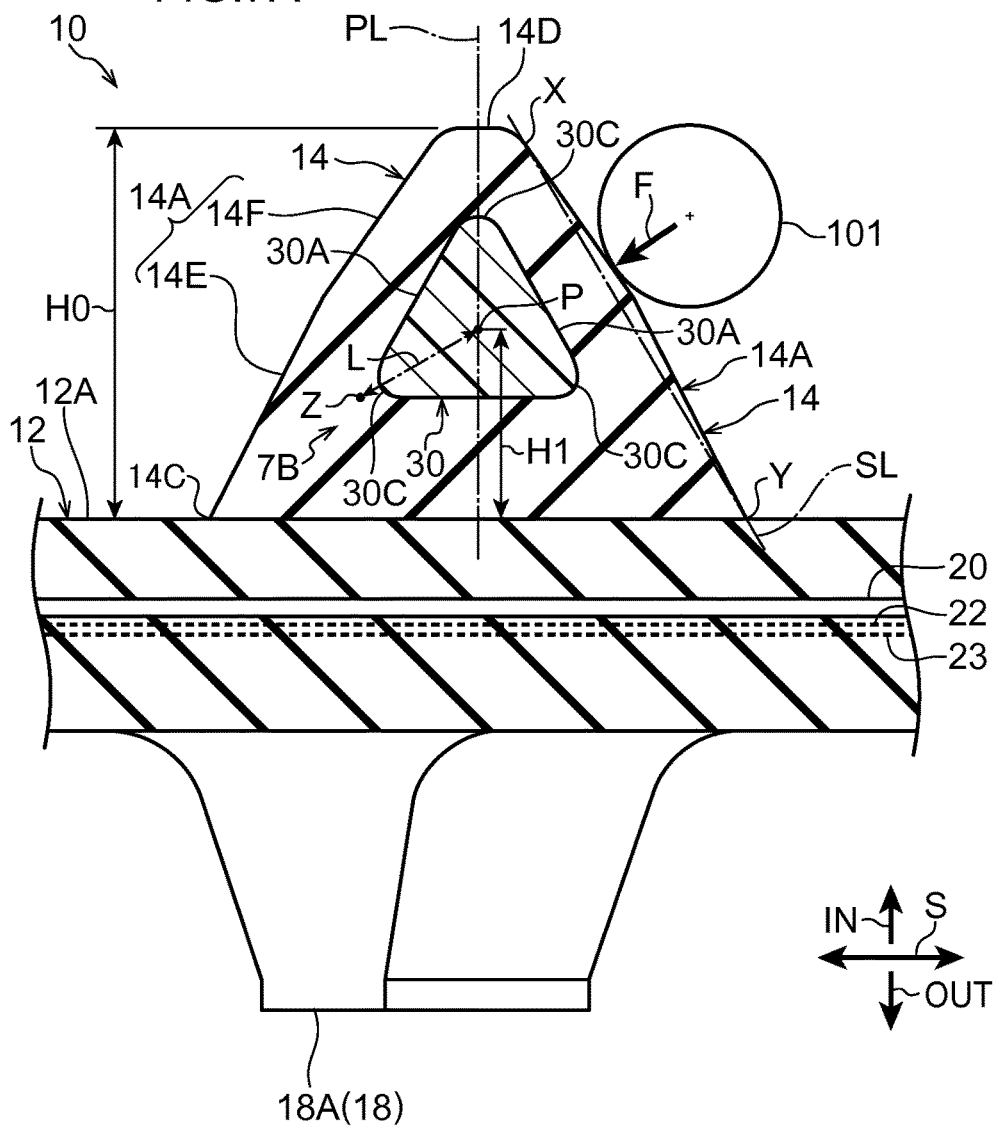
FIG. 7A is an enlarged view of the arrow 7A portion in FIG. 6, illustrating a state in which drive force is input from an engagement pin of a drive wheel to a rubber projection of the rubber crawler of the first exemplary embodiment.

As illustrated in FIG. 6 and FIG. 7A, the rubber projections 14 are each formed in a peaked shape widening from an apex portion 14D to a base portion 14C, as viewed from the crawler width direction.

The circumferential direction rubber wall faces 14A of the rubber projections 14 in the present exemplary embodiment are inclined in multiple steps (two steps) with respect to the crawler thickness direction (the thickness direction of the rubber crawler 10). Namely, the circumferential direction rubber wall faces 14A are each configured by an inclined portion 14E at the base portion 14C side, and an inclined portion 14F at the apex portion 14D side. The inclination angle of the inclined portion 14E in the crawler thickness direction is set smaller than that of the inclined portion 14F. Configuration of the present invention is not limited thereto, and the circumferential direction rubber wall face 14A may incline in a straight line shape with respect to the crawler thickness direction, without inclining in multiple steps.

As illustrated in FIG. 5 to FIG. 7A, the embedded members 30 are embedded inside the rubber projections 14. Both end portions 30B of the embedded member 30 extend in the crawler width direction and are exposed at the respective width direction rubber wall faces 14B of the rubber projection 14 (see FIG. 2 and FIG. 5). The end portions 30B that are the exposed portions of the embedded member 30 described above contact the width direction rubber wall faces 14B of the rubber projection 14 and the side face portions of the wheels, thereby enabling wear of the width direction rubber wall faces 14B of the rubber projection 14 to be suppressed.

In the present exemplary embodiment, the end portions 30B of the embedded member 30 are each exposed at both width direction rubber wall faces 14B of the rubber projection 14; however configuration of the present invention is not limited thereto, and the end portions 30B of the embedded member 30 may be unexposed at both width direction rubber wall faces 14B of the rubber projection 14.

The embedded members 30 are formed of resin material with a higher wear resistance than the rubber configuring the rubber projections 14. The resin material preferably has a high mechanical strength, such as ultrahigh molecular weight polyethylene or polyamide-based resin. In the present exemplary embodiment, the embedded member 30 is formed of polyamide-based resin.

In the present exemplary embodiment, the embedded member 30 is formed of resin material; however configuration of the present invention is not limited thereto, and the embedded member 30 may be formed of metal material.

As illustrated in FIG. 6 and FIG. 7A, circumferential direction wall faces 30A of the embedded member 30 in the crawler circumferential direction arranged along the circumferential direction rubber wall faces 14A as viewed in cross-section running along the crawler circumferential direction (hereafter referred to as crawler circumferential cross-section as appropriate). Note that "circumferential direction wall faces 30A . . . arranged along the circumferential direction rubber wall faces 14A" referred to herein indicates that, as viewed in crawler circumferential direction cross-section, an interval between the circumferential direction wall faces 30A and the circumferential direction rubber wall faces 14A is substantially uniform, and circumferential direction wall faces 30A incline with respect to the crawler thickness direction. As a result, "circumferential direction wall faces 30A . . . arranged along the circumferential direction rubber wall faces 14A" includes cases in which one wall face is a flat face and the other wall face is a curved face, cases in which one wall face is an inclined face inclining in multiple steps and the other walled face is a flat face or a curved face, and cases in which both wall faces are flat faces, curved faces, or are inclined in multiple steps. Moreover, "circumferential direction wall faces 30A . . . arranged along the circumferential direction rubber wall faces 14A" includes cases in which the circumferential direction wall faces 30A and the circumferential direction rubber wall faces 14A are parallel to each other.

In the configuration described above, as viewed in crawler circumferential direction cross-section, the rubber thickness between the circumferential direction wall faces 30A and the circumferential direction rubber wall faces 14A is substantially uniform. In the present exemplary embodiment, the rubber thickness between the circumferential direction wall faces 30A and the circumferential direction rubber wall faces 14A is substantially uniform across the entirety of the circumferential direction wall faces 30A.

In the present exemplary embodiment, each of the circumferential direction wall faces 30A has an inclined flat face inclining with respect to the crawler thickness direction. However, the present invention is not limited to the above configuration, and the circumferential direction wall face 30A may have a curved face that inclines while curving with respect to the crawler thickness direction.

In the present exemplary embodiment, the circumferential direction wall face 30A is parallel to a straight line SL passing through a start point X and an end point Y of the circumferential direction rubber wall face 14A of the rubber projection 14, as viewed in crawler circumferential direction cross-section.

As illustrated in FIG. 7A, the embedded member 30 is triangular shaped as viewed in crawler circumferential direction cross-section. Specifically, the crawler circumferential direction cross-section shape of the embedded member 30 is triangular, with corner portions 30C of the triangular shape curved in a circular arced shape. However, configuration of the present invention is not limited thereto, and the cross-section shape of the embedded member 30 may be a polygonal shape such as a trapezoidal shape.

As illustrated in FIG. 7A, in the cross-section running along the crawler circumferential direction, a center (center of gravity) P of the embedded member 30 is disposed on a bisector PL that divides the rubber projection 14 into two in the crawler circumferential direction. Namely, the embedded member 30 has left-right symmetry with respect to the bisector PL.

A height H1 of the center P of the embedded member 30 is set within a range from 15.2% to 60.1% of a height H0 of the rubber projection 14. The height H0 of the rubber projection 14 is measured along the crawler thickness direction from the inner peripheral face 12A of the rubber belt 12 to the apex portion 14D of the rubber projection 14, and the height H1 of the center P of the embedded member 30 is measured along the crawler thickness direction from the inner peripheral face 12A of the rubber belt 12 to the center P.

Figure 7B:
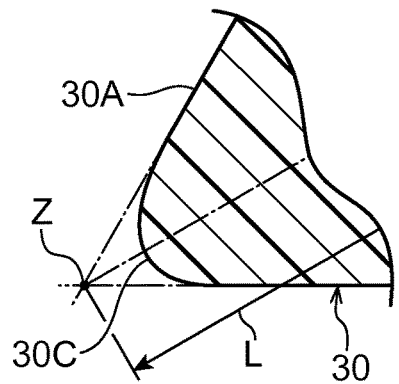
FIG. 7B is an enlarged view of the arrow 7B portion in FIG. 7A.

A length L from the center P of the embedded member 30 to an apex point Z of the corner portion 30C is set within a range from 30.3% to 39% of the height H0 of the rubber projection 14. As illustrated in FIG. 7B, the apex point Z of the corner portion 30C is the intersecting point of extension lines from respective edges of the embedded member 30.

As illustrated in FIG. 7A, in the present exemplary embodiment, the rubber projection 14 and the embedded member 30 have substantially similar shapes to each other as viewed in crawler circumferential direction cross-section.

Explanation follows operation and advantageous effects of the rubber crawler 10 of the present exemplary embodiment.

As illustrated in FIG. 7A, in the rubber crawler 10, the engagement pin 101 of the drive wheel 100 engages with the circumferential direction rubber wall face 14A of the rubber projection 14, and a drive force F is imparted to the rubber projection 14. Since the circumferential direction wall faces 30A of the embedded member 30 embedded in the rubber projection 14 arranged along the circumferential direction rubber wall face 14A as viewed in crawler circumferential direction cross-section, namely, since the rubber thickness of the portion corresponding to the circumferential direction wall faces 30A is substantially uniform, input from the engagement pin 101 is borne over a broad range by the circumferential direction wall face 30A of the embedded member 30. This enables concentration of distortion of the rubber projection 14 around the embedded member 30 to be suppressed.

Since the bending rigidity of the rubber projection 14 is improved by embedding the embedded member 30, resilient deformation of the rubber projection 14 so as to tilt over due to input from the engagement pin 101 is suppressed.

In the rubber crawler 10, since the side face portions of the drive wheel 100 contact the width direction rubber wall faces 14B of the rubber projection 14 and the end portions 30B of the embedded member 30 exposed at the width direction rubber wall faces 14B, relative displacement in the crawler width direction of the drive wheel 100 and the rubber belt 12 can be restricted.

Furthermore, since the embedded member 30 is formed of a resin material that has a higher wear resistance than the rubber projection 14, wear of the width direction rubber wall faces 14B of the rubber projection 14 due to friction with the drive wheel 100 can be suppressed.

In the rubber crawler 10, since the circumferential direction wall faces 30A of the embedded member 30 are formed with an inclined flat face inclining with respect to the crawler thickness direction, input from the engagement pins 101 can be borne substantially equally across the entire circumferential direction wall faces 30A of the embedded member 30, compared to a case in which, for example, the circumferential direction wall faces are curved faces.

Since the cross-section shape of the embedded member 30 as viewed in crawler circumferential cross-section is a triangular shape, the embedded member 30 can be made a lighter weight than, for example, cases in which a trapezoidal shape or another polygonal shape is employed.

Since the corner portions 30C are formed to the embedded member 30 at plural locations, movement of the embedded member 30 is suppressed by the corner portions 30C engaging with the surrounding rubber, even when the end portions 30B bear force in the rotation direction of the wheels due to contact with the wheels. This enables excessive distortion to be suppressed from occurring around the embedded member 30 of the rubber projection 14.

By setting the height H1 of the center P of the embedded member 30 within a range from 15.2% to 60.1% of the height H0 of the rubber projection 14, and by setting the length L from the center P of the embedded member 30 to the apex point Z of the corner portion 30C within a range from 30.3% to 39% of the height H0 of the rubber projection 14, distortion can be effectively suppressed from concentrating around the embedded member 30 of the rubber projection 14.

In the first exemplary embodiment, the embedded member 30 is formed in a triangular column shape extending in the crawler width direction; however configuration of the present invention is not limited thereto, and a hollow portion (such as a through hole) or the like extending in the crawler width direction may be formed in the embedded member 30. The weight of the embedded member 30 can be decreased by employing such a configuration.

In the first exemplary embodiment, the rubber belt 12 made of rubber and formed in an endless shape is employed as an example of an endless rubber body (an object with rubber resilience (namely, a rubber resilient body)) of the present invention; however configuration of the present invention is not limited thereto, and an elastomer belt made of rubber resilient elastomer and formed in an endless shape may be employed.

Exemplary embodiments have been described in the above explanation of the present invention, however these exemplary embodiments are merely examples, and various modifications may be implemented within a range not departing from the spirit of the present invention. It goes without saying that the scope of rights of the present invention are not limited by these exemplary embodiments.

Test Example

In order to verify the advantageous effects of the present invention, an Example rubber crawler of the present invention, and a Comparative Example rubber crawler not included in the present invention were tested as follows. The sample rubber crawlers employed during testing were the same size as each other.

Sample Rubber Crawlers

Example

A rubber crawler with the same structure as the rubber crawler of the first exemplary embodiment, with the height H0 of the rubber projection 14 set at 64 mm, the height H1 of the center P of the embedded member 30 set at 38.5 mm, and the length L from the center P of the embedded member 30 to the apex point Z set at 19.4 mm.

Comparative Example

A rubber crawler with an embedded member 30 formed in a circular column shape, and the remaining structure the same as the structure of the rubber crawler of the Example.

Test 1

Distortion occurring to the rubber projections 14 was derived using FEM analysis for when the circumferential direction rubber wall faces 14A of the rubber projections 14 of the sample rubber crawlers were pushed by the engagement pins 101 of the drive wheel 100 at a specific force. The results are indicated in Table 1. Note that in Table 1, the smaller the value, the better the result.

TABLE 1

|  | Comparative Example | Example |
|---|---|---|
| Distortion around embedded member (%) | 7.3 to 23.1 | 4.9 to 8.1 |

Test 2

The maximum value of distortions occurring to the rubber projections 14 were derived using FEM analysis for when the placement position and size (cross-section surface area) of the embedded member 30 of the rubber crawler of the Example inside the rubber projections 14 were changed (the height H1 and the Length L were changed). The results are indicated in Table 2. Note that in Table 2, the smaller the value, the better the result.

TABLE 2

|  |  | Height H1 (mm) | | | |
| --- | --- | --- | --- | --- | --- |
|  |  | 9.7 | 18.5 | 28.5 | 38.5 |
| Length L | 19.4 | 5.3% | 5.4% | 6.9% | 8.1% |
| (mm) | 25.0 | 5.1% | 4.9% | 5.6% | 8.7% |

As shown in Table 1 and Table 2, the rubber crawler of the Example of the present invention better suppresses concentration of distortion around the embedded member of the rubber projection than the rubber crawler of the Comparative Example.

Moreover, as illustrated in Table 2, the results of changing the height H1 and the length L of the rubber crawler of the Example shows that the distortion value in all cases is smaller than the maximum distortion in the Comparative Example. It is therefore preferable to set the height H1 within a range from 15.2% to 60.1% of the height H0 of the rubber projection, and to set the length L within a range from 30.3% to 39% of the height H0 of the rubber projection.

The invention claimed is:

1. A rubber crawler, comprising:

an endless rubber body entrained around a drive wheel;

a plurality of rubber projections that are provided at the rubber body at intervals along a circumferential direction of the rubber body, that project toward an inner circumferential side of the rubber body, that are each formed in a peaked shape widening from an apex portion to a base portion as viewed from a width direction of the rubber body, and that are input with drive force when an engagement pin provided at the drive wheel engages with a rubber wall face of the rubber projections in the rubber body circumferential direction; and an embedded member that is embedded in the rubber projections and has a wall face in the rubber body circumferential direction arranged along the rubber wall face as viewed in cross-section along the rubber body circumferential direction, wherein the embedded member has a triangular shape comprising three sides as viewed in cross-section along the rubber body circumferential direction;

a height of a center of the embedded member is within a range from 15.2% to 60.1% of a height of the rubber projections;

a length from the center of the embedded member to an apex point of a corner portion of the embedded member along the rubber body circumferential direction is within a range from 30.3% to 39% of a height of the rubber projections;

the embedded member is disposed at an inner circumferential side of an inner face of the rubber body;

the embedded member is a solid, rigid body; and the thickness of the rubber projections between the inner face of the rubber body and a face of the embedded member facing the inner face of the rubber body is greater than the thickness of the rubber projections between the apex portion of the rubber projections and the corner portion of the embedded member adjacent to the apex portion.

2. The rubber crawler of claim 1, wherein the wall face of the embedded member in the rubber body circumferential direction is an inclined flat face that inclines with respect to a thickness direction of the rubber body.

3. The rubber crawler of claim 1, wherein the wall face of the embedded member in the rubber body circumferential direction is an inclined flat face that inclines with respect to a thickness direction of the rubber body.

* * * * *